US008449655B2

(12) United States Patent
Baumann et al.

(10) Patent No.: US 8,449,655 B2
(45) Date of Patent: *May 28, 2013

(54) PROCESS FOR ISOLATING N$_2$O

(75) Inventors: Dieter Baumann, Speyer (DE);
Beatrice Roessler, Weisenheim am Sand (DE); Joaquim Henrique Teles, Otterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 945 days.

This patent is subject to a terminal disclaimer.

(21) Appl. No.: 12/518,659

(22) PCT Filed: Dec. 7, 2007

(86) PCT No.: PCT/EP2007/063510
§ 371 (c)(1),
(2), (4) Date: Jun. 11, 2009

(87) PCT Pub. No.: WO2008/071632
PCT Pub. Date: Jun. 19, 2008

(65) Prior Publication Data
US 2010/0018389 A1 Jan. 28, 2010

(30) Foreign Application Priority Data
Dec. 11, 2006 (EP) .................... 06125807

(51) Int. Cl.
*B01D 53/14* (2006.01)
(52) U.S. Cl.
USPC ............................... 95/232; 423/235
(58) Field of Classification Search
None
See application file for complete search history.

(56) References Cited

U.S. PATENT DOCUMENTS

| | | | |
|---|---|---|---|
| 2,636,898 A | 4/1953 | Buckley | |
| 3,656,899 A | 4/1972 | Baechle et al. | |
| 4,080,423 A * | 3/1978 | Smith et al. | 423/210 |
| 4,154,806 A | 5/1979 | Szabo et al. | |
| 4,177,645 A | 12/1979 | Schwarz | |
| 4,425,313 A * | 1/1984 | Cooper | 423/235 |
| 4,824,647 A * | 4/1989 | Scott | 423/235 |
| 5,645,805 A * | 7/1997 | Oehr et al. | 423/239.1 |
| 5,849,257 A | 12/1998 | Fujiwara et al. | |
| 6,370,911 B1 | 4/2002 | Zhou et al. | |
| 6,387,161 B1 | 5/2002 | Zhou et al. | |
| 6,505,482 B2 | 1/2003 | Zhou et al. | |
| 7,105,704 B2 | 9/2006 | Panov et al. | |
| 7,754,172 B2 * | 7/2010 | Teles et al. | 423/235 |
| 2003/0026744 A1 * | 2/2003 | Hakka et al. | 422/177 |
| 2005/0203316 A1 | 9/2005 | Panov et al. | |
| 2006/0106258 A1 | 5/2006 | Panov et al. | |
| 2008/0255393 A1 | 10/2008 | Teles et al. | |
| 2008/0274032 A1 | 11/2008 | Teles et al. | |
| 2009/0087898 A1 * | 4/2009 | Haase et al. | 435/262.5 |
| 2010/0044208 A1 * | 2/2010 | Kuroki et al. | 204/157.3 |
| 2011/0226989 A9 * | 9/2011 | Seeker et al. | 252/182.33 |

FOREIGN PATENT DOCUMENTS

| | | |
|---|---|---|
| CS | 1 53889 | 3/1974 |
| CS | 1 61507 | 6/1975 |
| DE | 2040 219 | 3/1971 |
| DE | 27 32 267 | 1/1979 |
| DE | 10 2005 055 588 | 5/2007 |
| EP | 1 076 217 | 2/2001 |
| GB | 649 680 | 1/1951 |
| WO | 98 25698 | 6/1998 |
| WO | 00 01654 | 1/2000 |
| WO | 00 73202 | 12/2000 |
| WO | 03 078370 | 9/2003 |
| WO | 03 078371 | 9/2003 |
| WO | 03 078372 | 9/2003 |
| WO | 03 078374 | 9/2003 |
| WO | 03 078375 | 9/2003 |
| WO | 2004 000777 | 12/2003 |
| WO | 2004 096745 | 11/2004 |
| WO | 2005 030689 | 4/2005 |
| WO | 2005 030690 | 4/2005 |
| WO | 2006 032502 | 3/2006 |

OTHER PUBLICATIONS

Noskov, A.S. et al., "Ammonia oxidation into nitrous oxide over Mn/Bi/Al catalyst I. Single cooling tube experiments", Chemical Engineering Journal, Elsevier, vol. 91, pp. 235-242, (2003).
Panov, Gennady I. et al., "Non-Catalytic Liquid Phase Oxidation of Alkenes with Nitrous Oxide. 1. Oxidation of Cyclohexene to Cyclohexanone", React.Kinet.Catal.Lett., vol. 76, No. 2, pp. 401-406, (2002).
Dubkov, Konstantin A. et al., "Non-Catalytic Liquid Phase Oxidation of Alkenes with Nitrous Oxide. 2. Oxidation of Cyclopentene to Cyclopentanone", React.Kinet.Catal.Lett., vol. 77, No. 1, pp. 197-205, (2002).

(Continued)

*Primary Examiner* — Duane Smith
*Assistant Examiner* — Pankti Patel
(74) *Attorney, Agent, or Firm* — Oblon, Spivak, McClelland, Maier & Neustadt, L.L.P.

(57) ABSTRACT

The present invention relates to a process for purifying a gas mixture G-0 comprising dinitrogen monoxide, at least comprising the contacting of the gas mixture G-0 with a solvent mixture (I) at least comprising 50% by weight of water based on the overall solvent mixture (I), the pH of the solvent mixture (I) being in the range from 3.5 to 8.0, the desorption of a gas mixture G-1 from a composition (A), the contacting of the gas mixture G-1 with a solvent mixture (II) at least comprising 50% by weight of water based on the overall solvent mixture (II), the pH of the solvent mixture (II) being in the range from 2.0 to 8.0, and the desorption of a gas mixture G-2 from a composition (B), the pH being based in each case on a measurement with a glass electrode, and to the use of gas mixtures obtainable by a process according to the invention as oxidizing agents for olefins.

10 Claims, No Drawings

OTHER PUBLICATIONS

Starokon, E. V. et al., "Liquid Phase Oxidation of Alkenes with Nitrous Oxide to Carbonyl Compounds", Adv. Synth. Catal., vol. 346, pp. 268-274, (2004).

Thiemann, Michael et al., "Nitric Acid, Nitrous Acid, and Nitrogen Oxides", Encyclopedia, 6$^{th}$ Edition, Section 1.4.2.3, pp. 1-49, (2000).

Buck, R. P. et al., Measurement of pH. Definition, Standards, and Procedures, Pure Appl. Chem., IUPAC, vol. 74, No. 10, pp. 2169-2200, (Oct. 2002).

Uriarte, Anthony K. "Nitrous Oxide ($N_2O$)—Waste to Value", Studies in Surface Science and Catalysis, vol. 130, pp. 743-748, (2000).

* cited by examiner

PROCESS FOR ISOLATING $N_2O$

The present invention relates to a process for purifying a gas mixture G-0 comprising dinitrogen monoxide, at least comprising the contacting of the gas mixture G-0 with a solvent mixture (I) at least comprising 50% by weight of water based on the overall solvent mixture (I), the pH of the solvent mixture (I) being in the range from 3.5 to 8.0, the desorption of a gas mixture G-1 from a composition (A), the contacting of the gas mixture G-1 with a solvent mixture (II) at least comprising 50% by weight of water based on the overall solvent mixture (II), the pH of the solvent mixture (II) being in the range from 2.0 to 8.0, and the desorption of a gas mixture G-2 from a composition (B), the pH being based in each case on a measurement with a calibrated and temperature-compensated glass electrode, and to the use of gas mixtures obtainable by a process according to the invention as oxidizing agents for olefins.

The prior art discloses various preparation processes and purification processes for dinitrogen monoxide. It is likewise known that dinitrogen monoxide can be used, for example, as an oxidizing agent for olefins.

For instance, WO 98/25698 discloses a process for preparing dinitrogen monoxide by catalytic partial oxidation of $NH_3$ with oxygen. According to WO 98/25698, a catalyst composed of manganese oxide, bismuth oxide and aluminum oxide is used, which leads to dinitrogen monoxide with high selectivity. A similar catalyst system is also described in detail in a scientific study (Noskov et al., Chem. Eng. J. 91 (2003) 235-242). U.S. Pat. No. 5,849,257 likewise discloses a process for preparing dinitrogen monoxide by oxidation of ammonia. The oxidation takes place in the presence of a copper-manganese oxide catalyst.

In the process disclosed in WO 00/01654, dinitrogen monoxide is prepared by reducing a gas stream comprising $NO_x$ and ammonia.

The oxidation of an olefinic compound to an aldehyde or a ketone by means of dinitrogen monoxide is described, for example, in GB 649,680 or the equivalent U.S. Pat. No. 2,636,898. Both documents quite generally disclose that the oxidation can in principle be effected in the presence of a suitable oxidation catalyst.

The more recent scientific articles of G. L. Panov et al., "Non-Catalytic Liquid Phase Oxidation of Alkenes with Nitrous Oxide. 1. Oxidation of Cyclohexene to Cyclohexanone", React. Kinet. Catal. Lett. Vol. 76, No. 2 (2002) p. 401-405, and K. A. Dubkov et al., "Non-Catalytic Liquid Phase Oxidation of Alkenes with Nitrous Oxide. 2. Oxidation of Cyclopentene to Cyclopentanone", React. Kinet. Catal. Lett. Vol. 77, No. 1 (2002) p. 197-205 likewise describe oxidations of olefinic compounds with dinitrogen monoxide. A scientific article "Liquid Phase Oxidation of Alkenes with Nitrous Oxide to Carbonyl Compounds" by E. V. Starokon et al. in Adv. Synth. Catal. 2004, 346, 268-274 also includes a mechanistic study of the oxidation of alkenes with dinitrogen monoxide in the liquid phase.

The synthesis of carbonyl compounds from alkenes with dinitrogen monoxide is also described in various international patent applications. For instance, WO 03/078370 discloses a process for preparing carbonyl compounds from aliphatic alkenes with dinitrogen monoxide. The reaction is carried out at temperatures in the range from 20 to 350° C. and pressures of from 0.01 to 100 atm. WO 03/078374 discloses a corresponding process for preparing cyclohexanone. According to WO 03/078372, cyclic ketones having from 4 to 5 carbon atoms are prepared. According to WO 03/078375, cyclic ketones are prepared under these process conditions from cyclic alkenes having from 7 to 20 carbon atoms. WO 03/078371 discloses a process for preparing substituted ketones from substituted alkenes. WO 04/000777 discloses a process for reacting di- and polyalkenes with dinitrogen monoxide to give the corresponding carbonyl compounds. The purification of dinitrogen monoxide is not mentioned in these documents.

It is likewise known that offgas streams comprising dinitrogen monoxide can be used for further reactions. Dinitrogen monoxide is obtained as an undesired by-product in various chemical processes, especially in oxidations with nitric acid and there very particularly in the oxidation of cyclohexanone and/or cyclohexanol to adipic acid. Other examples of processes in which dinitrogen monoxide is obtained as an undesired by-product are the oxidation of cyclododecanone and/or cyclododecanol with nitric acid to give dodecanedicarboxylic acid and the partial oxidation of $NH_3$ to NO.

For instance, WO 2005/030690, WO 2005/030689 and WO 2004/096745 disclose processes for oxidizing olefins with dinitrogen monoxide, specifically the oxidation of cyclododecatriene, of cyclododecene and of cyclopentene. All three applications disclose that, in addition to other dinitrogen monoxide sources, it is also possible to use offgas streams which can be purified, for example, by distillative methods before they are used as oxidizing agents.

Both in the preparation of dinitrogen monoxide and in the use of offgas streams, $N_2O$ is obtained initially as a dilute gaseous mixture with other components. These components can be divided into those which have a disruptive effect for specific applications and those which behave inertly. For use as an oxidizing agent, gases having a disruptive effect include $NO_x$ or, for example, oxygen ($O_2$). The term "$NO_x$", as understood in the context of the present invention, refers to all compounds $N_aO_b$ where a is 1 or 2 and b is a number from 1 to 6, except $N_2O$. Instead of the term "$NO_x$", the term "nitrogen oxides" is also used in the context of the present invention. Disruptive secondary components also include $NH_3$ and organic acids.

For specific applications, it is necessary to purify the dinitrogen monoxide used before the reaction. For example, for the use of dinitrogen monoxide as an oxidizing agent, it is necessary to remove disruptive secondary components such as oxygen or nitrogen oxides $NO_x$.

Processes for removing $NO_x$ are known in principle from the prior art. A review is given, for example, by M. Thiemann et. al in Ullmann's Encyclopedia, 6th Edition, 2000, Electronic Edition, Chapter "Nitric Acid, Nitrous Acid, and Nitrogen Oxides", Section 1.4.2.3.

The application WO 00/73202 describes a method as to how $NO_x$ and $O_2$ can be removed from an $N_2O$-containing gas stream. The $NO_x$ is removed by catalytic reduction with $NH_3$ and oxygen by catalytic reduction with hydrogen or other reducing agents. However, this method has the disadvantage that the product is contaminated with $NH_3$. A high depletion of oxygen is possible only when a loss of $N_2O$ is accepted (of from 3 to 5% of the amount originally present).

For specific applications, it may be necessary also to remove the inert compounds, since they can slow the desired reaction with $N_2O$ by dilution. The term "inert gas", as used in the context of the present invention, refers to a gas which behaves inertly with regard to the reaction of $N_2O$ with an olefin, i.e. reacts under the conditions of the reaction of olefins with $N_2O$ neither with the olefins nor with $N_2O$. Inert gases include, for example, nitrogen, carbon dioxide, argon, methane, ethane and propane. However, the inert gases can lower the space-time yield, so that a depletion can likewise be advantageous. However, it may likewise be advantageous to obtain a gas mixture which still comprises inert gases, such as carbon dioxide, and then can be used directly in a further reaction.

DE 27 32 267 A1 discloses, for example, a process for purifying dinitrogen monoxide, wherein nitrogen oxide, nitrogen dioxide, carbon dioxide and water are initially removed and the gas mixture is subsequently liquefied by compression to from 40 to 300 bar and cooling to from 0 to −88° C. From this liquefied gas mixture, dinitrogen monoxide is then removed. Although this method achieves a purification and concentration of the $N_2O$, it is economically unattractive owing to the required high pressure (60 bar), the low temperatures (−85° C.) and the associated high capital costs.

U.S. Pat. No. 4,177,645 discloses a process for removing dinitrogen monoxide from offgas streams which likewise comprises a prepurification and a low temperature distillation. The application EP 1 076 217 A1 likewise describes a method for removing low-boiling impurities from $N_2O$ by low temperature distillation.

U.S. Pat. No. 6,505,482, U.S. Pat. No. 6,370,911 and U.S. Pat. No. 6,387,161 also disclose processes for purifying dinitrogen monoxide, in which a low temperature distillation is in each case carried out in a special plant.

However, as a result of the high pressures and low temperatures, a low temperature distillation entails high apparatus demands, which make the purification of the dinitrogen monoxide with such a process inconvenient and costly. Particularly troublesome in this context is the fact that the melting point of $N_2O$ at standard pressure is only 3 K below the boiling point. It is therefore necessary to employ high pressures.

DT 20 40 219 discloses a preparation process for dinitrogen monoxide, wherein the dinitrogen monoxide obtained is concentrated and purified after the synthesis. According to DT 20 40 219, dinitrogen monoxide is prepared initially by oxidizing ammonia. The dinitrogen monoxide prepared is purified by separating the oxidized gases and concentrating by absorption under high pressure, which is followed by a desorption under reduced pressure. Secondary components are removed, for example, by treatment with an alkali solution in a scrubbing tower. According to DT 20 40 219, water is used as the solvent for the absorption of the gas mixture.

It is possible with the process disclosed in DT 20 40 219 to separate the different nitrogen oxides, but the process entails the use of large amounts of solvent and/or high pressures for the absorption. At the same time, a further scrubbing tower is needed for the process disclosed by DT 20 40 219 for removing further troublesome components.

WO 2006/032502 discloses a process for purifying a gas mixture comprising dinitrogen monoxide, which comprises at least one absorption of the gas mixture in an organic solvent and subsequent desorption of the gas mixture from the laden organic solvent, and also the adjustment of the content of nitrogen oxides $NO_x$ in the gas mixture to at most 0.5% by volume based on the total volume of the gas mixture. WO 2006/032502 also discloses that the process may comprise a plurality of absorption and desorption steps. WO 2006/032502 discloses only organic solvents as the absorption medium.

DE 10 2005 055588.5 relates to a process for purifying a gas mixture G-0 comprising dinitrogen monoxide, at least comprising the absorption of the gas mixture G-0 in an organic solvent, subsequent desorption of a gas mixture G-1 from the laden organic solvent, absorption of the gas mixture G-1 in water and subsequent desorption of a gas mixture G-2 from the laden water, and to the use of a purified gas mixture comprising dinitrogen monoxide, obtainable by such a process as an oxidizing agent for olefins.

Starting from this prior art, it was an object of the present invention to provide a safe process with which dinitrogen monoxide-containing streams can be purified and concentrated in an effective and inexpensive manner. Dinitrogen monoxide purified in this way is required in particular as an oxidizing agent.

It was a further object of the present invention to provide processes for preparing gas mixtures which can be used as an oxidizing agent without further treatment or addition of other inertizing agents.

According to the invention, this object is achieved by a process for purifying a gas mixture G-0 comprising dinitrogen monoxide, at least comprising the following steps:

A1 contacting the gas mixture G-0 with a solvent mixture (I) at least comprising 50% by weight of water based on the overall solvent mixture (I), the pH of the solvent mixture (I) being in the range from 3.5 to 8.0, to obtain a composition (A);

A2 desorption of a gas mixture G-1 from the composition (A) to obtain a solvent mixture (I');

B1 contacting the gas mixture G-1 with a solvent mixture (II) at least comprising 50% by weight of water based on the overall solvent mixture (II), the pH of the solvent mixture (II) being in the range from 2.0 to 8.0, to obtain a composition (B);

B2 desorption of a gas mixture G-2 from the composition (B) to obtain a solvent mixture (II');

the pH being based in each case on a measurement with a glass electrode, preferably with a calibrated and temperature-compensated glass electrode.

In the context of this application, the pH is measured with a commercially available glass electrode which had been calibrated beforehand against buffer of known pH. All pH data are based on a measurement with a calibrated and temperature-compensated glass electrode. If the calibration temperature differs from the measurement temperature, temperature compensation is used. This definition and this procedure correspond to the currently valid IUPAC recommendation (R. P. Buck et al., *Pure Appl. Chem.* (2002) 74(11), p. 2169-2200 and in particular section 11 therein).

One advantage of the process according to the invention is that, in addition to the troublesome components, some of the inert components are also removed. The dinitrogen monoxide purified in accordance with the invention is thus simultaneously concentrated. However, as a result of the process according to the invention, carbon dioxide, which has an inertizing action, remains at least partly in the gas mixture G-2, so that the gas mixture G-2 can be used directly and safely as an oxidizing agent without addition of further inert gases.

At the same time, the process according to the invention additionally has the advantage that the solvent mixture (I) or (II), at least comprising 50% by weight of water, based in each case on the overall solvent mixture (I) or (II), is used for step A1 or step B1. This avoids contacting dinitrogen monoxide, as a strong oxidizing agent, in relatively high concentrations with an organic solvent, which would lead to a high level of apparatus complexity and high costs. The inventive use of the solvent mixture (I) or (II), at least comprising 50% by weight of water, based on the overall solvent mixture (I) or (II), in the contacting and the desorption according to step A1 and A2 or step B1 and B2 additionally avoids contamination of the gas mixture with organic solvent, which might lead to further purification steps.

It is thus possible by the process according to the invention to provide a safe oxidizing agent as a gas mixture.

The inventive selection of the pH of the solvent mixture (I) and the solvent mixture (II) achieves almost complete depletion of $NO_x$. As a result, a separate removal of $NO_x$, for example by means of DeNOx or SCR-DeNOx, becomes superfluous. As a result, in the process according to the invention, there is, for example, also no risk of contamination of the product stream with $NH_3$, which is used as a reducing agent for the DeNOx stage.

The inventive controlled selection of the pH of the solvent mixture (I) and of the solvent mixture (II) can in particular achieve good depletion of $NO_x$ with only a minimal change in the carbon dioxide content.

The solvent mixture (I) and (II) used in accordance with the invention has, at the inventive pH, a high selectivity for the desired components, especially dinitrogen monoxide and carbon dioxide. At the same time, the absolute solubility of dinitrogen monoxide in the solvent mixture (I) or (II) used in accordance with the invention is sufficient to achieve concentration. At the same time, the solvent mixture (I) or (II) used in accordance with the invention has the advantage that no safety problems occur even under pressure in the presence of concentrated dinitrogen monoxide.

According to the invention, the gas mixture G-1 has a higher content of dinitrogen monoxide than the gas mixture G-0. According to the invention, the gas mixture G-2 in turn has a higher content of dinitrogen monoxide than the gas mixture G-1.

The gas mixture G-2 purified in accordance with the invention can be used advantageously as the oxidizing agent especially in liquid form. Advantageously, the gas mixture G-2 also comprises carbon dioxide in addition to dinitrogen monoxide. $CO_2$ has an inertizing action for gas mixtures comprising dinitrogen monoxide and ensures safe operation in the course of preparation and especially in the course of storage and further use of the gas mixture G-2 comprising dinitrogen monoxide. It has been found that, in the presence of $CO_2$ as an inert gas in gas mixtures comprising $N_2O$ in comparison to other inert gases, distinctly smaller amounts of carbon dioxide are required to suppress the self-decomposition tendency of dinitrogen monoxide. Thus, small amounts of $CO_2$ are sufficient for inertization of the gas mixture G-2.

The process according to the invention for purifying a gas mixture G-0 comprising dinitrogen monoxide comprises steps A1, A2, B1 and B2.

First, in step A1, the gas mixture G-0 is contacted with a solvent mixture (I) at least comprising 50% by weight of water based on the overall solvent mixture (I), the pH of the solvent mixture (I) being in the range from 3.5 to 8.0, to obtain a composition (A). When the gas mixture G-0 is contacted with the solvent mixture (I), in accordance with the invention, the gas mixture G-0 is absorbed at least partly in the solvent mixture (I). According to the invention, the pH of the solvent mixture (I) is in the range from 3.5 to 8.0, so that, in particular, individual gases present in the gas mixture G-0 are absorbed selectively, while other constituents of the gas mixture G-0 are absorbed only to a lower degree, if at all.

According to the invention, the pH may be within this range without further measures. However, it is equally possible in accordance with the invention to adjust the pH within this range by suitable measures, for example by adding acid or base. The pH of the solvent mixture (I), in accordance with the invention, will preferably be adjusted within the range from 3.5 to 8.0 by suitable measures. More preferably, the pH of the solvent mixture (I), in accordance with the invention, will be adjusted within the range from 3.5 to 8.0 by adding at least one base.

Step A1 affords a composition (A) which comprises the solvent mixture (I) and absorbed constituents of the gas mixture G-0 and if appropriate reaction products of the absorbed constituents. At the same time, the contacting in step A1 affords a gas mixture depleted in the absorbed constituents, which is preferably not converted any further in accordance with the invention.

According to the invention, the composition (A) is treated further in step A2. In step A2, a gas mixture G-1 is desorbed from the composition (A) to obtain a solvent mixture (I'). In this step, the gases absorbed beforehand are desorbed partly or fully. According to the invention, dinitrogen monoxide is desorbed substantially completely, while, for example, other nitrogen oxides $NO_x$ are not desorbed. The solvent mixture (I') may in particular comprise salts. The gas mixture G-1 comprises, in accordance with the invention, especially dinitrogen monoxide, nitrogen and carbon dioxide.

The gas mixture G-0 comprises, in accordance with the invention, for example, dinitrogen monoxide, nitrogen, oxygen, carbon dioxide, argon and carbon monoxide.

According to the invention, the gas mixture G-1 is treated further in step B1. In this step, the gas mixture G-1 is contacted with a solvent mixture (II) at least comprising 50% by weight of water based on the overall solvent mixture (II), the pH of the solvent mixture (II) being in the range from 2.0 to 8.0, to obtain a composition (B). When the gas mixture G-1 is contacted with the solvent mixture (II), in accordance with the invention, the gas mixture G-1 is absorbed at least partly in the solvent mixture (II).

According to the invention, the pH of the solvent mixture (II) is in the range from 2.0 to 8.0, so that, in particular, individual gases present in the gas mixture G-1 are absorbed selectively, while other constituents of the gas mixture G-1 are absorbed only to a lower degree, if at all. Step B1 affords a composition (B) which comprises the solvent mixture (II) and absorbed constituents of the gas mixture G-1 and if appropriate reaction products of the absorbed constituents. At the same time, the contacting in step B1 affords a gas mixture depleted in the absorbed constituents, which is preferably not converted any further in accordance with the invention.

The composition (B) is treated further in step B2 in accordance with the invention. In step B2, a gas mixture G-2 is desorbed from the composition (B) to obtain a solvent mixture (II'). In this step, the gases absorbed beforehand are desorbed partly or completely. At the same time, dinitrogen monoxide is desorbed substantially completely, while, for example, other nitrogen oxides $NO_x$ are not desorbed. The solvent mixture (II') may in particular comprise salts.

According to the invention, the gas mixture G-0 comprising dinitrogen monoxide used may in principle stem from any source.

The term "gas mixture" herein refers to a mixture of two or more compounds which are in the gaseous state at ambient pressure and ambient temperature. At altered temperature or altered pressure, the gas mixture may also be present in another state of matter, for example liquid, and is still referred to as a gas mixture in the context of the present invention.

In the context of the present invention, the composition of the gas mixtures or of the liquefied gas mixtures is specified in % by volume. The data relate to the composition of the gas mixtures at ambient pressure and ambient temperature.

In principle, the composition of the mixtures may be determined in the context of the present invention in any way known to those skilled in the art. The composition of the gas mixtures is determined in the context of the present invention preferably by gas chromatography. However, it may also be determined by means of UV spectroscopy, IR spectroscopy or by wet chemical methods.

When a gas mixture G-0 is used, its content of dinitrogen monoxide is substantially arbitrary, as long as it is guaranteed that the inventive purification is possible.

The $N_2O$-containing gas mixtures which are used as the gas mixture G-0 for this process generally have an $N_2O$ content between 2 and 80% by volume of $N_2O$. It also comprises, for example, from 2 to 21% by volume of $O_2$ and up to 30% by volume of $NO_x$ as undesired components. In addition, it may also comprise varying amounts of $N_2$, $H_2$, $CO_2$, CO, $H_2O$, $NH_3$; traces of organic compounds may also be present. For example, the gas mixture G-0 may also comprise from 9 to 13% by volume of $N_2$ and up to 5.5% by volume of $NH_3$. The sum of the components of the gas mixture G-0 adds up to 100% by volume.

In a preferred embodiment of the process according to the invention, a gas mixture G-0 comprising at least 3% by volume of dinitrogen monoxide is used, but preference is given in turn to using mixtures having a dinitrogen monoxide content in the range from 4 to 60% by volume, more preferably in the range from 5 to 25% by volume and especially preferably in the range from 8 to 14% by volume.

In a preferred embodiment of the present invention, the gas mixture G-0 comprising dinitrogen monoxide is at least one dinitrogen monoxide-containing offgas of a chemical process. The scope of the present invention also embraces embodiments in which at least two nitrogen monoxide-containing offgases of a single plant serve as the gas mixture comprising dinitrogen monoxide. Equally embraced are embodiments in which at least one dinitrogen monoxide-containing offgas of one plant and at least one further dinitrogen monoxide-containing offgas of at least one further plant serve as the gas mixture comprising dinitrogen monoxide.

Accordingly, the present invention also relates to a process as described above, wherein the gas mixture comprising dinitrogen monoxide is at least one dinitrogen monoxide-containing offgas of at least one industrial process.

The term "gas mixture comprising dinitrogen monoxide" refers in the context of the present invention both to embodiments in which the offgas mentioned is subjected to the inventive purification process in unmodified form and to embodiments in which at least one of the offgases mentioned is subjected to a modification.

The term "modification" as used in this context within the scope of the present invention refers to any suitable process by which the chemical composition of a gas mixture is altered. Accordingly, the term "modification" comprises, inter alia, embodiments in which a dinitrogen monoxide-containing offgas is concentrated with regard to the dinitrogen monoxide content in at least one suitable process. Preference is given to not subjecting the offgas to any modification.

In a further embodiment, the chemical composition of an offgas may also be altered by adding pure dinitrogen monoxide to the offgas.

The gas mixture G-0 comprising $N_2O$ which is used may, for example, be an offgas from an industrial process. It preferably stems from an offgas of a plant for preparing carboxylic acids by oxidation of alcohols or ketones with nitric acid, for example from an adipic acid or dodecanedicarboxylic acid plant, from the offgas of a nitric acid plant which uses the above offgas streams as a reactant, from the offgas of a plant for the partial oxidation of $NH_3$ or from the offgas of a plant which uses the gas mixtures generated therein, for example a hydroxylamine plant.

According to the invention, it is also possible to use a mixture of different offgases.

In a more preferred embodiment of the present invention, the at least one dinitrogen monoxide-containing offgas stems from an adipic acid plant, a dodecanedicarboxylic acid plant, a hydroxylamine plant and/or a nitric acid plant, the latter in turn preferably being operated with at least one offgas of an adipic acid plant, of a dodecanedicarboxylic acid plant or of a hydroxylamine plant.

In a preferred embodiment, the offgas stream of an adipic acid plant is used, in which generally from 0.8 to 1.0 mol of $N_2O$ is formed per mole of adipic acid formed by oxidation of cyclohexanol/cyclohexanone mixtures with nitric acid. As described, for example, in A. K. Uriarte et al., Stud. Surf. Sci. Catal. 130 (2000) p. 743-748, the offgases of adipic acid plants also comprise different concentrations of further constituents including nitrogen, oxygen, carbon dioxide, carbon monoxide, nitrogen oxides, water and volatile organic compounds.

The abovementioned dodecanedicarboxylic acid plant is substantially of an identical plant type.

An example of a typical composition of an offgas of an adipic acid plant or of a dodecanedicarboxylic acid plant is reproduced in the following table:

| Component | Concentrations/% by wt. |
|---|---|
| $NO_x$ | 19-25 |
| $N_2O$ | 20-28 |
| $N_2$ | 30-40 |
| $O_2$ | 7-10 |
| $CO_2$ | 2-3 |
| $H_2O$ | ~7 |

The offgas stream of an adipic acid plant or of a dodecanedicarboxylic acid plant may be used directly in the process according to the invention.

In a likewise preferred embodiment, the offgas stream of a nitric acid plant is used which is fed fully or partly with offgases comprising dinitrogen monoxide and nitrogen oxides from other processes. In such nitric acid plants, nitrogen oxides are adsorbed and for the most part converted to nitric acid, while dinitrogen monoxide is not converted. For example, such a nitric acid plant may be supplied by nitrogen oxides which are prepared by selective combustion of ammonia and by offgases of an adipic acid plant and/or by offgases of a dodecanedicarboxylic acid plant. It is equally possible to supply such a nitric acid plant solely by offgases of an adipic acid plant and/or by offgases of a dodecanedicarboxylic acid plant.

The offgases of such nitric acid plants always comprise varying concentrations of still further constituents including nitrogen, oxygen, carbon dioxide, carbon monoxide, nitrogen oxides, water and volatile organic compounds.

An example of a typical composition of an offgas of such a nitric acid plant is reproduced in the following table:

| Component | Concentrations/% by wt. |
|---|---|
| $NO_x$ | <0.1 |
| $N_2O$ | 4-36 |

-continued

| Component | Concentrations/% by wt. |
|---|---|
| $N_2$ | 57-86 |
| $O_2$ | 3-9 |
| $CO_2$ | 1-4 |
| $H_2O$ | ~0.6 |

The offgas stream of a nitric acid plant may be used directly in the process according to the invention.

In a likewise preferred embodiment of the process according to the invention, the offgas stream of a hydroxylamine plant is used, in which, for example, ammonia is initially oxidized with air or oxygen to give NO, and small amounts of dinitrogen monoxide are formed as a by-product. The NO is subsequently hydrogenated with hydrogen to give hydroxylamine. Since dinitrogen monoxide is inert under the hydrogenation conditions, it accumulates in the hydrogen circuit. In preferred process versions, the purge stream of a hydroxylamine plant comprises dinitrogen monoxide in the range from 9 to 13% by volume in hydrogen. This purge stream may be used as such for the inventive purification. It is equally possible to concentrate this stream in a suitable manner with regard to the dinitrogen monoxide content as described above.

Accordingly, the present invention also relates to a process as described above, wherein the gas mixture G-0 is the offgas of an adipic acid plant and/or of a dodecanedicarboxylic acid plant and/or of a hydroxylamine plant and/or of a nitric acid plant operated with the offgas of an adipic acid plant and/or of a dodecanedicarboxylic acid plant and/or of a hydroxylamine plant.

It is equally possible in the context of the process according to the invention to selectively prepare dinitrogen monoxide for use in the process. Preference is given inter alia to the preparation via the thermal decomposition of $NH_4NO_3$, as described, for example, in U.S. Pat. No. 3,656,899, whose contents on this subject are incorporated by reference fully into the context of the present application. Preference is likewise further given to the preparation via the catalytic oxidation of ammonia, as described, for example, in U.S. Pat. No. 5,849,257 or in WO 98/25698, whose contents on this subject are incorporated by reference fully into the context of the present application.

According to the invention, the $N_2O$ is concentrated by contacting the gas mixture G-0 with the solvent mixture (I) and thus a first absorption of $N_2O$ and thus preferably, owing to the similar physical properties, also of $CO_2$ from the gas mixture G-0 in the solvent mixture (I) and subsequent desorption of the gas mixture G-1 from the composition (A) in step A1 and step A2.

According to the invention, the pH of the solvent mixture (I) in the contacting in step A1 is in the range from 3.5 to 8.0. At this pH, in accordance with the invention, there is good absorption of dinitrogen monoxide and carbon dioxide in the solvent mixture (I), while other gases which may be present in the gas mixture G-0 are absorbed to a small degree, if at all. The pH is preferably within a range from 5.0 to 5.7, more preferably within a range from 6.0 to 7.0.

According to the invention, the pH is measured before or during the contacting in step A1 of the process according to the invention and then, for example, the pH is adjusted by suitable measures. It is equally possible in accordance with the invention that no measures are needed to adjust the pH.

In principle, the pH can, in accordance with the invention, be adjusted by all measures known to those skilled in the art. Suitable measures for adjusting the pH are, for example, addition of an acid or base or addition of further solvent.

For example, the pH of the solvent mixture (I) is measured before or after the contacting in step A1 and the pH is established within the inventive range by suitable measures. According to the invention, the pH can be measured continuously or discontinuously.

In the contacting in step A1, in accordance with the invention, there is an absorption to obtain a composition (A) and a gas stream depleted in the absorbed gases. According to the invention, the composition (A) has a different pH from the solvent mixture (I).

According to the invention, the composition (A) comprises, for example, from 90.0 to 99.9999% by weight of water, in particular from 95.0 to 99.999% by weight, preferably from 98.0 to 99.99% by weight of water; for example from 0.01 to 0.25% by weight of dinitrogen monoxide, in particular from 0.05 to 0.2% by weight, preferably from 0.1 to 0.15% by weight of dinitrogen monoxide; for example from 0.0001 to 0.1% by weight of carbon dioxide, in particular from 0.001 to 0.05% by weight of carbon dioxide; for example from 0.0001 to 0.1% by weight of nitrogen, in particular from 0.001 to 0.05% by weight of nitrogen; for example from 0.05 to 1.5% by weight of sodium nitrite, in particular from 0.1 to 1.0% by weight, preferably from 0.25 to 0.75% by weight of sodium nitrite; for example from 0.05 to 1.5% by weight of sodium nitrate, in particular from 0.1 to 1.0% by weight, preferably from 0.25 to 0.75% by weight of sodium nitrate; for example from 0.0001 to 0.1% by weight sodium hydrogencarbonate, in particular from 0.001 to 0.05% by weight of sodium hydrogencarbonate; and also traces of oxygen and argon. The sum of the components of the composition (A) adds up to 100% by weight.

According to the invention, the depleted gas stream comprises, for example, from 0.1 to 2.0% by volume of argon, in particular from 0.25 to 1.5% by volume, preferably from 0.5 to 1.0% by volume of argon; for example from 1.0 to 10% by volume of oxygen, in particular from 2.5 to 7.5% by volume, preferably from 4.0 to 6.0% by volume of oxygen; for example from 1.0 to 10% by volume of dinitrogen monoxide, in particular from 2.5 to 7.5% by volume, preferably from 4.0 to 6.0% by volume of dinitrogen monoxide; for example from 70 to 99.9% by volume of nitrogen, in particular from 75 to 95% by volume, preferably from 80 to 90% by volume of nitrogen; for example from 0.01 to 0.5% by volume of carbon monoxide, in particular from 0.05 to 0.25% by volume, preferably from 0.08 to 0.1% by volume of carbon monoxide; for example from 0.1 to 1.5% by volume of carbon dioxide, in particular from 0.25 to 1.0% by volume, preferably from 0.5 to 0.75% by volume of carbon dioxide; for example from 0.1 to 1.5% by volume of water, especially from 0.25 to 1.0% by volume, preferably from 0.5 to 0.75% by volume of water. The sum of the components of the gas stream adds up to 100% by volume.

Step A1 of the process according to the invention is preferably performed continuously. In the context of the present invention, this means that the solvent mixture (I) and the gas mixture G-0 are contacted continuously to continuously form the composition (A) and the depleted gas stream.

According to the invention, the contacting in step A1 preferably absorbs dinitrogen monoxide and carbon dioxide. According to the invention, for example, nitrogen, oxygen and argon may also be absorbed. Nitrogen oxides $NO_x$ are also absorbed in step A1.

The process according to the invention further comprises a step A2 in which a gas mixture G-1 is desorbed from the composition (A) to obtain a solvent mixture (I').

In step A2, dinitrogen monoxide and carbon dioxide are preferably desorbed from the composition (A).

For example, in the case that, in the process according to the invention, the pH is adjusted by adding a base, especially sodium hydroxide solution, the solvent mixture (I') comprises, in accordance with the invention, for example from 90.0 to 99.9999% by weight of water, in particular from 95.0 to 99.999% by weight, preferably from 98.0 to 99.99% by weight of water; for example from 0.001 to 0.1% by weight of dinitrogen monoxide, for example from 0.05 to 1.5% by weight of sodium nitrite, especially from 0.1 to 1.0% by weight, preferably from 0.25 to 0.75% by weight of sodium nitrite; for example from 0.05 to 1.5% by weight of sodium nitrate, especially from 0.1 to 1.0% by weight, preferably from 0.25 to 0.75% by weight of sodium nitrate; for example from 0.0001 to 0.1% by weight of sodium hydrogencarbonate, especially from 0.001 to 0.05% by weight of sodium hydrogencarbonate. The solvent mixture (I') may additionally also comprise further compounds. The sum of the components of the composition (A) adds up to 100% by weight.

The solvent mixture (I) used in accordance with the invention, at least comprising 50% by weight of water based on the overall solvent mixture (I), comprises, for example, from 50 to 100% by weight of water, preferably from 60 to 99.999% by weight of water, in particular from 70 to 99% by weight of water, more preferably from 80 to 98% by weight of water, for example from 90 to 95% by weight of water. In one embodiment, the solvent mixture (I) comprises at least 80% by weight of water, based in each case on the overall solvent mixture (I).

According to the invention, the solvent mixture, as well as water, may also comprise other polar water-miscible solvents, for example glycols. The solvent mixture (I) preferably does not comprise any further polar solvents. In addition, the solvent mixture (I), as well as water, may also comprise dissolved salts, for example salts of the alkali metals or alkaline earth metals, especially hydroxides, hydrogencarbonates, carbonates, nitrates, nitrites, sulfates, hydrogenphosphates or phosphates.

According to the invention, the content of salts in the solvent mixture (I) is less than 5% by weight, preferably less than 2.5% by weight, in particular less than 1.0% by weight, more preferably less than 0.5% by weight. The content of salts in the solvent mixture (I) is for example from 0.0001 to 5% by weight, preferably from 0.001 to 2.5% by weight, in particular from 0.01 to 1.0% by weight.

The desorption in step A2 affords a gas mixture G-1 and a solvent mixture (I').

In the context of the present invention, the gas mixture G-1 has, for example, a content of $N_2O$ of from 40 to 80% by volume, preferably from 45 to 75% by volume, in particular from 50 to 65% by volume, more preferably, for example, 51% by volume, 52% by volume, 53% by volume, 54% by volume, 55% by volume, 56% by volume, 57% by volume, 58% by volume, 59% by volume, 60% by volume, 61% by volume, 62% by volume, 63% by volume, 64% by volume or 65% by volume.

The gas mixture G-1 has, for example, a content of $CO_2$ of from 5 to 15% by volume, preferably of from 6 to 12% by volume, more preferably, for example, 7% by volume, 9% by volume, 10% by volume or 11% by volume. At the same time, the gas mixture G-1 has, for example, a content of O2 of from 1.0 to 4.0% by volume, preferably of from 1.5 to 3.5% by volume, more preferably from 2.5 to 3.1% by volume, for example 2.6% by volume, 2.7% by volume, 2.8% by volume, 2.9% by volume or 3.0% by volume. In addition, the gas mixture G-1 may comprise from 20 to 40% by volume of $N_2$, preferably from 20 to 35% by volume, and also further components, for example nitrogen oxides. $NO_x$ may be present, for example, in an amount of from 0 to 0.1% by volume, preferably from 0.0001 to 0.01% by volume, more preferably from 0.0002 to 0.05% by volume. The sum of the components of the gas mixture G-1 adds up to 100% by volume. The gas mixture G-1 may additionally comprise from 0 to 10% by volume of water, in particular from 2 to 8% by volume, preferably from 4 to 6% by volume of water.

In step B1 and B2, the gas mixture G-1 is contacted with a suitable solvent mixture (II) and the gas mixture G-2 is subsequently desorbed.

The process according to the invention also has a step B1 and a step B2. According to the invention, the pH of the solvent mixture (II) in the contacting in step B1 is within the range from 2.0 to 8.0. At this pH, in accordance with the invention, there is good absorption of dinitrogen monoxide and carbon dioxide in the solvent mixture (II), while other gases which may be present in the gas mixture G-1 are absorbed to a slight degree, if at all. The pH is preferably within a range from 2.5 to 8.0, in particular from 3.5 to 8.0, further preferably from 5.0 to 5.7, more preferably within a range from 6.0 to 7.0.

According to the invention, the pH may be within this range without any further measures. However, it is equally possible in accordance with the invention to establish the pH within this range by suitable measures, for example by adding acid or base.

According to the invention, the pH may be measured before or during the contacting in step B1 of the process according to the invention and then the pH may be adjusted if appropriate by suitable measures. According to the invention, the pH may be measured continuously or discontinuously.

Preferably, the pH of the solvent mixture (II) is measured before the contacting in step B1 and the pH is established within the inventive range.

In the contacting in step B1, in accordance with the invention, there is an absorption to obtain a composition (B) and a gas stream depleted in the absorbed gases. According to the invention, the composition (B) has a different pH from the solvent mixture (II).

According to the invention, the composition (B) comprises, for example, from 90.0 to 99.9999% by weight of water, in particular from 95.0 to 99.999% by weight, preferably from 98.0 to 99.99% by weight of water; for example from 0.01 to 2.5% by weight of dinitrogen monoxide, in particular from 0.1 to 1.5% by weight, preferably from 0.5 to 1.0% by weight of dinitrogen monoxide; for example from 0.001 to 0.5% by weight of carbon dioxide, especially from 0.01 to 0.25% by weight of carbon dioxide; for example from 0.0001 to 0.1% by weight of nitrogen, in particular from 0.001 to 0.05% by weight of nitrogen; and also traces of oxygen and argon. The sum of the components of the composition (B) adds up to 100% by weight.

Step B1 of the process according to the invention is preferably performed continuously. In the context of the present invention, this means that the solvent mixture (II) and the gas mixture G-1 are contacted continuously to form the composition (B) and the depleted gas stream continuously.

Preference is given to performing steps A1 and B1 of the process according to the invention continuously.

According to the invention, the contacting in step B1 preferably absorbs dinitrogen monoxide and carbon dioxide. Nitrogen oxides $NO_x$ remaining in the gas mixture G-1 are also absorbed in step B1.

According to the invention, preferably from 60 to 80% of the entering gas stream is absorbed.

The process according to the invention further comprises a step B2 in which a gas mixture G-2 is desorbed from the composition (B) to obtain a solvent mixture (II'). In step B2, preference is given to desorbing dinitrogen monoxide and carbon dioxide from the composition (B). The solvent mixture (II') may, in accordance with the invention, have a different pH from the composition (B) or the solvent mixture (II). It is equally possible in accordance with the invention that the solvent mixture (II'), the composition (B) and the solvent mixture (II) have the same pH or a pH which is within the same range.

When the pH of the solvent mixture (I) and of the solvent mixture (II) is adjusted, the pH of the solvent mixture (I) and of the solvent mixture (II) may be adjusted independently of one another. According to the invention, it is also possible that only the pH of the solvent mixture (I) or of the solvent mixture (II) is adjusted. However, the pH of the solvent mixture (I) and of the solvent mixture (II) may, in accordance with the invention, also be established within the same range.

Irrespective of the solvent mixture (I) used in accordance with the invention, the solvent mixture (II) used in accordance with the invention comprises at least 50% by weight of water, for example from 50 to 100% by weight of water, preferably from 60 to 99.999% by weight of water, in particular from 70 to 99% by weight of water, more preferably from 80 to 98% by weight of water, for example from 90 to 95% by weight of water. In one embodiment, the solvent mixture (II) comprises at least 80% by weight of water, based in each case on the overall solvent mixture (II).

The present invention therefore also relates to a process as described above for purifying a gas mixture G-0 comprising dinitrogen monoxide, wherein the solvent mixture (I) or the solvent mixture (II) or the solvent mixture (I) and the solvent mixture (II) comprises at least 80% by weight of water, based in each case on the overall solvent mixture (I) or (II).

According to the invention, the solvent mixture may, as well as water, also comprise other polar water-miscible solvents, for example glycols. The solvent mixture (II) preferably does not comprise any further polar solvents. In addition, the solvent mixture (II) may, as well as water, also comprise dissolved salts, for example salts of alkali metals or alkaline earth metals, especially hydroxides, hydrogencarbonates, carbonates, nitrates, nitrites, sulfates, hydrogenphosphates or phosphates.

According to the invention, the content of salts in the solvent mixture (I) is less than 5% by weight, preferably less than 2.5% by weight, in particular less than 1.0% by weight, more preferably less than 0.5% by weight. The content of salts in the solvent mixture (I) is, for example, from 0.0001 to 5% by weight, preferably from 0.001 to 2.5% by weight, in particular from 0.01 to 1.0% by weight.

The present invention therefore also relates to a process as described above for purifying a gas mixture G-0 comprising dinitrogen monoxide, wherein the solvent mixture (I) or the solvent mixture (II) or the solvent mixture (I) and the solvent mixture (II) comprises less than 10% by weight of salts, based in each case on the overall solvent mixture (I) or (II).

According to the invention, the pH of the solvent mixture (I) is preferably within a range from 3.5 to 8.0, more preferably within the range from 5.0 to 7.5 and most preferably within the range from 6.0 to 7.0. The pH of the solvent mixture (II) is, in accordance with the invention, preferably within a range from 2.0 to 8.0, in particular within the range from 2.5 to 8.0, further preferably within the range from 3.5 to 8.0, more preferably within the range from 5.0 to 7.5 and most preferably within the range from 6.0 to 7.0.

The present invention therefore also relates to a process as described above for purifying a gas mixture G-0 comprising dinitrogen monoxide, wherein the pH of the solvent mixture (I) or the pH of the solvent mixture (II) or the pH of the solvent mixture (I) and the pH of the solvent mixture (II) is in the range from 6.0 to 7.0.

According to the invention, the pH of the solvent mixture (I) or (II) may be adjusted by means of any method known to those skilled in the art. In particular, the pH can be adjusted by adding a base to the solvent mixture (I) or (II).

Suitable measures are, for example, addition of an acid or of a base or supply of solvent with simultaneous discharge of laden solvent.

The present invention therefore also relates to a process as described above for purifying a gas mixture G-0 comprising dinitrogen monoxide, wherein the pH of the solvent mixture (I) or the pH of the solvent mixture (II) or the pH of the solvent mixture (I) and the pH of the solvent mixture (II) is adjusted by adding a base.

In principle, the base used may be any conceivable compound whose pH as a 1% by weight solution in water is >8.0. Preference is given in accordance with the invention to using strong inorganic bases, especially hydroxides, carbonates, hydrogencarbonates or phosphates of alkali metals or alkaline earth metals. Particular preference is given to using NaOH, KOH, $Na_2CO_3$, $NaHCO_3$, $Na_3PO_4$, $K_3PO_4$. Preference is further given to the use of bases in the form of a concentrated aqueous solution.

In the context of the present invention, suitable concentration ranges are, for example, from 10 to 60% aqueous solutions, preferably from 20 to 55% aqueous solutions, more preferably from 25 to 50% aqueous solutions, for example 30% aqueous solutions, 35% aqueous solutions, 40% aqueous solutions or 45% aqueous solutions.

Particular preference is given in accordance with the invention to the use of an aqueous NaOH solution as a base.

In a preferred embodiment of the present invention, the base used is a from 25 to 50% aqueous NaOH solution.

The present invention therefore also relates to a process as described above for purifying a gas mixture G-0 comprising dinitrogen monoxide, wherein the pH of the solvent mixture (I) or the pH of the solvent mixture (II) or the pH of the solvent mixture (I) and the pH of the solvent mixture (II) is adjusted by adding a base selected from the group consisting of alkali metal hydroxides, alkali metal carbonates, alkali metal hydrogencarbonates, alkali metal phosphates, alkaline earth metal hydroxides, alkaline earth metal carbonates, alkaline earth metal hydrogencarbonates and alkaline earth metal phosphates.

The gas mixture G-2 obtained by the purification process according to the invention comprises at least 50% by volume of $N_2O$, more preferably at least 60% by volume of $N_2O$ and most preferably at least 75% by volume of $N_2O$. Typically, the gas mixture G-2 comprises up to 99% by volume of $N_2O$, in particular up to 97% by volume of $N_2O$, for example up to 96% by volume of $N_2O$, up to 95% by volume of $N_2O$, up to 94% by volume of $N_2O$, up to 93% by volume of $N_2O$, up to 92% by volume of $N_2O$, up to 91% by volume of $N_2O$, up to 90% by volume of $N_2O$ or else up to 85% by volume of $N_2O$.

In the context of the present invention, the gas mixture G-2 has, for example, a content of $N_2O$ of from 60 to 95% by volume, preferably of from 70 to 90% by volume, in particular of from 75 to 85% by volume, more preferably, for example, 76% by volume, 77% by volume, 78% by volume, 79% by volume, 80% by volume, 81% by volume, 82% by volume, 83% by volume, 84% by volume or 85% by volume.

The gas mixture G-2 has, for example, a content of $CO_2$ of from 1 to 20% by volume, preferably of from 5 to 15% by volume, more preferably, for example, 6% by volume, 7% by volume, 8% by volume, 9% by volume, 10% by volume, 11% by volume, 12% by volume, 13% by volume or 14% by volume. At the same time, the gas mixture G-2 has, for example, a content of $O_2$ of from 0.01 to 5.0% by volume, preferably of from 0.1 to 2.5% by volume, more preferably, for example, from 0.2 to 1.0% by volume. In addition, the gas mixture G-2 may comprise from 0.1 to 10% by volume of $N_2$, preferably from 0.5 to 5% by volume, and also further components, for example nitrogen oxides or solvent residues. At the same time, the gas mixture G-2 comprises less than 1% by volume of $O_2$, in particular less than 0.5% by volume of $O_2$, less than 0.5% by volume of $NO_x$. $NO_x$ may be present, for example, in an amount of from 0 to 0.1% by volume, preferably from 0.0001 to 0.01% by volume, more preferably from 0.0002 to 0.02% by volume. The sum of the components of the gas mixture G-2 adds up to 100% by volume.

In a preferred embodiment of the process according to the invention, both the solvent mixture (I') and the solvent mixture (II') may be recycled at least partly into the process according to the invention.

It is possible in accordance with the invention that the solvent mixture (I') and/or the solvent mixture (II') are recycled into the process according to the invention at least partly as the solvent mixture (I) or (II). According to the invention, the solvent mixture (I') and/or the solvent mixture (II') can, in particular, be treated before it is reused in the process as the solvent mixture (I) or (II). It is possible in particular that first the pH of the solvent mixture (I') and/or (II') is determined and then, if appropriate, the pH is established within the range of the pH of the solvent mixture (I) or (II) by suitable measures.

In particular, it is also possible in accordance with the invention that only a portion of the solvent mixture (I') and/or (II') is reused in the process and, for example, is admixed with water or another solvent, in order then to be reused in the process as the solvent mixture (I) and/or (II).

When the solvent mixture (I') and/or (II') is recycled fully or partly back into the process, the pH is measured preferably before, after or during the desorption in step A2 and/or B2, especially before the desorption. The pH can be measured, in particular, continuously in the desorber. However, it is also possible in accordance with the invention to measure the pH of the solvent mixture in the desorber.

The contacting in step A1 or B1 of the process according to the invention and thus the absorption can in principle be effected by all processes known to those skilled in the art. In particular, the absorption in the solvent mixture can be brought about by increasing the pressure of the reactant gas or by lowering the temperature of the solvent mixture or by a combination of the measures mentioned.

In step A1 or B1 of the process according to the invention, the gas mixture is preferably initially compressed, for example to a pressure of from 10 to 35 bar, preferably of from 13 to 30 bar, preferably of from 14 to 25 bar. Subsequently, the compressed gas mixture is preferably contacted at this pressure with the solvent mixture (I) in step A1 or in the solvent mixture (II) in step B1.

The present invention therefore also relates to a process as described above for purifying a gas mixture G-0 comprising dinitrogen monoxide, wherein the pressure in the contacting in A1 or B1 or A1 and B1 is in a range of from 10 to 35 bar.

According to the invention, the contacting in step A1 and B1 is effected in devices (absorbers) in which a gas-liquid phase interface is generated, by means of which heat and mass transfer between the phases is enabled, and which, if required, are equipped with internal or external devices for heat supply and/or heat removal.

The phases can be conducted in the absorber in cocurrent, in countercurrent or a combination thereof.

According to the invention, the contacting or the absorption can be carried out in one or more stages, preferably in one stage. In the contacting, the absorber used is preferably a device with a plurality of theoretical plates, in particular from 2 to 8 theoretical plates, more preferably from 3 to 6.

Possible embodiments of the absorber are columns having trays, for example bubble-cap trays or sieve trays, columns having structured internals, for example structured packings, columns having unstructured internals, for example random packings, or apparatus in which the liquid phase is present in dispersed form, for example by spraying in nozzles, or a combination thereof.

The desorption of the gas mixture G-1 or G-2 from the composition (A) or composition (B) in step A2 or B2 of the process according to the invention may be brought about by pressure reduction via the solvent mixture, temperature increase of the solvent mixture or by stripping with solvent vapor or a combination thereof.

The demands on the devices (desorbers) for the desorption of the gas mixture G-1 or G-2 from the composition (A) or composition (B), and the conduction of the phases, are analogous to those of the absorber, i.e. suitable units are those in which a gas-liquid phase interface is generated, through which heat and mass transfer between the phases is enabled, and which are equipped if required with internal or external equipment for heat supply and/or heat removal.

According to the invention, the desorption may be carried out in one or more stages.

Possible embodiments of the desorber are a simple (flash) vessel and columns.

A preferred embodiment of the present invention in which the contacting with the solvent mixture and the desorption are combined in one apparatus is, for example, the dividing wall column. In this column, the contacting and the associated absorption, and the desorption are operated in countercurrent in several stages by temperature change, combined with a stripping with solvent vapor. In this context, an apparatus combination of contacting and desorption can be effected both in A1 and A2, and in B1 and B2, especially in a dividing wall column.

In a preferred embodiment, the present invention therefore relates to a process as described above, wherein steps A1 and A2, or steps B1 and B2, or steps A1 and A2 and steps B1 and B2 are carried out in a dividing wall column.

In a particularly preferred embodiment of the invention, in step A1, the gas mixture G-0 comprising $N_2O$ is initially contacted with the solvent mixture (I) under elevated pressure $p_{abso}$ in an absorption column operated in countercurrent and having random packing, which allows an absorption to take place to obtain a composition (A). In step A2 of this embodiment, the composition (A) is transferred into a vessel in which the composition (A) is decompressed to a lower pressure $p_{deso} < p_{abso}$. The process is preferably operated virtually isothermally with a temperature differential between absorption and desorption temperature of not more than 20K, preferably not more than 15K, in particular not more than 10K. The absorption pressure is from 1 to 100 bar, preferably from 5 to 65 bar, in particular from 10 to 40 bar, preferably from 10 to 35 bar, more preferably from 13 to 30 bar, further preferably from about 14 to 25 bar, and the desorption pressure from 0.1 to 2 bar absolute, preferably from 0.5 to 1.5 bar absolute, more preferably from 1.0 to 1.2 bar absolute.

Preference is likewise given, in step B1, to first contacting the gas mixture G-1 with a solvent mixture (II) under elevated pressure $p_{abso}$ in an absorption column operated in countercurrent and having random packing to obtain the composition (B). In step B2, composition (B) is transferred into a vessel in which the composition (B) is decompressed to a lower pressure $p_{deso} < p_{abso}$. The process is preferably likewise operated virtually isothermally with a temperature differential between absorption and desorption temperature of not more than 20K, preferably not more than 15K, in particular not more than 10K. The absorption pressure is from 1 to 100 bar, preferably from 5 to 65 bar, in particular from 10 to 40 bar, preferably from 10 to 35 bar, more preferably from 13 to 30 bar, further preferably from about 14 to 25 bar, and the desorption pressure from 0.1 to 2 bar absolute, preferably from 0.5 to 1.5 bar absolute, more preferably from 1.0 to 1.2 bar absolute.

In this embodiment, the gas mixture G-0 in the contacting in A1 preferably has an $N_2O$ content of from 4 to 25% by volume, preferably of from 6 to 20% by volume, in particular of from 8 to 18% by volume, more preferably, for example, 9% by volume, 10% by volume, 11% by volume, 12% by volume, 13% by volume, 14% by volume, 15% by volume, 16% by volume or 17% by volume.

The gas mixture G-0 has, for example, a content of $CO_2$ of from 0.1 to 7.5% by volume, preferably of from 0.5 to 5% by volume, more preferably from 1 to 2.5% by volume. At the same time, the gas mixture G-0 has, for example, a content of $O_2$ of from 1 to 10% by volume, preferably of from 2 to 7.5% by volume, more preferably, for example, from 3.0 to 6% by volume. Moreover, the gas mixture G-0 may comprise from 50 to 95% by volume of $N_2$, preferably from 60 to 90% by volume, more preferably from 70 to 85% by volume, and also further components, for example nitrogen oxides or solvent residues. $NO_x$ may be present, for example, in an amount of from 0 to 0.2% by volume, preferably from 0.0001 to 0.15% by volume, more preferably from 0.0005 to 0.1% by volume. The sum of the components of the gas mixture G-0 adds up to 100% by volume.

According to the invention, it is possible as described above that the solvent mixture (I') is recycled into the process at least partly as the solvent mixture (I), or that the solvent mixture (II') is recycled into the process at least partly as the solvent mixture (II). The solvent mixture (I') or (II') may be reused completely or partly, preferably partly, as the solvent mixture (I) or (II).

According to the invention, it is especially preferred that a portion of the solvent mixture (I') or (II') is discharged from the process. According to the invention, it is possible, for example, to discharge from 0.01 to 5% of the overall solvent mixture, preferably from 0.05 to 2.5%, in particular from 0.1 to 1.0%, for example 0.2%, 0.3%, 0.4%, 0.5%, 0.6%, 0.7%, 0.8% or 0.9%.

According to the invention, it is preferable that the solvent mixture (I') or (II') is recycled partly, in which case other compounds, especially water, may be added to the solvent mixture in each case. In this case, other compounds are added in an amount corresponding to the amount of the solvent mixture (I') or (II') which is not recycled into the process. The pH is then, in accordance with the invention, adjusted to a range suitable for the solvent mixture (I) or (II). According to the invention, it is possible that the pH is measured continuously.

According to the invention, it is also possible to reuse the solvent mixture (I') or (II') completely as the solvent mixture (I) or (II), provided that it is ensured that the pH of the solvent mixture (I) or (II) is established within the inventive range. In this case, it is especially possible in accordance with the invention that suitable measures remove individual compounds from the solvent mixture (I') or (II'), for example salts or solvents, before the particular mixture is recycled into the process as the solvent mixture (I) or (II).

The present invention therefore also relates to a process as described above for purifying a gas mixture G-0 comprising dinitrogen monoxide, wherein the solvent mixture (I') is recycled into the process at least partly as the solvent mixture (I), or wherein the solvent mixture (II') is recycled into the process at least partly as the solvent mixture (II), or wherein the solvent mixture (I') is recycled into the process at least partly as the solvent mixture (I) and the solvent mixture (II') is recycled into the process at least partly as the solvent mixture (II).

In this process version, the process according to the invention is preferably practiced as a continuous process.

In a particularly preferred continuous version of the process, a portion of the solvent mixture (I') or (II') is discharged and replaced by demineralized water. The amount of the solvent mixture which is to be discharged and the amount of fresh solvent, especially of water, which is to be added are such that, firstly, the amount of solvent mixture (I) or (II) in the system remains approximately constant and, secondly, the amount of dissolved salts in the solvent mixture (I) or in the solvent mixture (II) preferably does not rise above 10% by weight and more preferably not above 7% by weight, based in each case on the overall solvent mixture (I) or (II). In addition to steps A1, A2, B1 and B2, the process according to the invention may also comprise further steps. For example, the process may also comprise a further treatment of the gas mixture G-1 between steps A2 and B1. Such treatments comprise, for example, a change in the temperature or a change in the pressure or a change in the temperature and in the pressure.

For example, the composition of a gas mixture may change, for example by condensation of one of the components. These components may, for example, be water or another compound present in the solvent mixture, preferably a solvent which is used in the solvent mixture (I) for the contacting in step A1 in the process according to the invention.

According to the invention, it is possible that further components are removed from the gas mixture G-1 or G-2. For example, it is possible that traces of water which may be present in the gas mixture G-2 after the desorption in step B2 may be removed from the gas mixture G-2 by compression and subsequent cooling.

In this case, the gas mixture G-2 is advantageously compressed to a pressure of from 1 to 35 bar, preferably from 2 to 30 bar, further preferably from 3 to 27 bar. Cooling is preferably effected subsequently, preferably to from 1 to 25° C., more preferably from 3 to 20° C., in particular from 4 to 15° C., further preferably from 8 to 12° C.

It is equally possible in the context of the present invention, after steps A1, A2, B1 and B2, for example, to carry out a partial condensation of dinitrogen monoxide or a rectification, especially to remove low boilers remaining in the gas mixture G-2, for example oxygen and nitrogen.

According to the invention, the gas mixture G-2 which comprises dinitrogen monoxide and has been purified by the process according to the invention can be used in a further reaction. To this end, the gas mixture may be used in gaseous form. However, it is also possible first to treat the resulting gas mixture such that the gas mixture is present in liquid or supercritical form and is then used in a further reaction. The gas mixture can be liquefied by suitable selection of the pressure or of the temperature.

The present invention thus also relates to a process, wherein the resulting gas mixture G-2 is liquefied.

To this end, the gas mixture G-2 is first preferably compressed and then cooled. In this case, the gas mixture G-2 is compressed advantageously to a pressure of from 1 to 35 bar, preferably from 2 to 30 bar, more preferably from 3 to 27 bar. Cooling is preferably effected subsequently, preferably to from 10 to −70° C., more preferably from 8 to −30° C., in particular from 5 to −25° C.

One advantage of the process according to the invention is that $CO_2$, in addition to the good inertizing action in comparison to other inert gases, has a boiling curve very similar to that of $N_2O$ and similar critical parameters. As a result, the gas mixture G-2 which comprises $N_2O$ and, if appropriate, $CO_2$ and is obtained in the process according to the invention can be condensed at a higher temperature than a comparable mixture of $N_2O$ and another inert gas. As a result of the very similar boiling curves, the condensed gas mixture has almost the same ratio of $N_2O$ to $CO_2$ as the gaseous mixture, so that the inertizing agent is retained in the liquid phase.

Moreover, $CO_2$ has a good solubility in organic compounds, so that a relatively low pressure is sufficient to avoid the formation of a gas phase in the reactor in the case of a reaction in the liquid phase.

The gas mixture G-2 which comprises dinitrogen monoxide and has been obtained by a process according to the invention can in principle be used for all applications in which pure dinitrogen monoxide streams or dinitrogen monoxide streams admixed with inert gas are typically used. In particular, the gas mixtures are suitable, for example, for the oxidation of methanol to formaldehyde, as described, for example, in EP-A 0 624 565 or DE-A 196 05 211. The present invention therefore also relates to the use of the gas mixtures which comprise dinitrogen monoxide and are obtainable by a process according to the invention as an oxidizing agent for methanol.

The process according to the invention affords gas mixtures G-2 comprising dinitrogen monoxide which comprise a particularly low proportion of troublesome secondary components. This is advantageous especially for the use of the gas mixture comprising dinitrogen monoxide as the oxidizing agent, since, as a result of the low proportion of troublesome secondary components, hardly any side reactions occur and thus particularly pure products can be obtained in an oxidation. After the inventive purification, the gas mixture G-2 preferably also comprises carbon dioxide in suitable amounts in addition to dinitrogen monoxide.

The gas mixture G-2 purified in accordance with the invention comprises preferably from 50 to 99.0% by volume of dinitrogen monoxide, from 1 to 20% by volume of carbon dioxide and from 0 to 25% by volume of further gases. The percentages by volume reported are each based on the overall gas mixture G-2. The sum of the individual components of the gas mixture G-2 adds up to 100% by volume.

The gas mixture G-2 purified in accordance with the invention preferably comprises from 60 to 95% by volume of dinitrogen monoxide, in particular from 70 to 90% by volume, more preferably from 75 to 89% by volume of dinitrogen monoxide.

The gas mixture G-2 purified in accordance with the invention also comprises from 1 to 20% by volume of carbon dioxide. The gas mixture G-2 preferably comprises from 5 to 15% by volume of carbon dioxide, in particular from 6 to 14% by volume of carbon dioxide.

The gas mixture G-2 preferably comprises from 0 to 25% by volume of further gases. The gas mixture G-2 purified in accordance with the invention may comprise one or more further gases, the amount specified being based on the sum of the gases present. The gas mixture G-2 may comprise for example oxygen, nitrogen and water.

It has been found that, in the presence of $CO_2$ as an inert gas in gas mixtures comprising $N_2O$, distinctly smaller amounts of the inert gas, i.e. carbon dioxide, in comparison to other inert gases are required in order to ensure safe operation, for example in order to suppress self-decomposition of dinitrogen monoxide.

The present invention therefore also relates to the use of a gas mixture obtainable by a process according to the invention, as described above, as an oxidizing agent, especially as an oxidizing agent for olefins.

In particular, the present invention also relates to the use of a gas mixture comprising from 50 to 99.0% by volume of dinitrogen monoxide, from 1 to 20% by volume of carbon dioxide and from 0 to 25% by volume of further gases as an oxidizing agent, especially as an oxidizing agent for olefins.

Such gas mixtures are obtainable, for example, by the purifying process according to the invention.

In principle, the gas mixtures which comprise dinitrogen monoxide and are obtainable in accordance with the invention are suitable for the oxidation of olefins. Suitable olefins are, for example, open-chain or cyclic olefins having one or more double bonds. Preference is further given to cyclic olefins having one or more double bonds, for example cyclopentene, cyclohexene, cycloheptene, cyclooctene, cyclodecene, cycloundecene, cyclododecene, 1,4-cyclohexadiene, 1,5-cyclooctadiene, 1,5-cyclododecadiene or 1,5,9-cyclododecatriene.

In a preferred embodiment, the present invention therefore also relates to a use as described above as an oxidizing agent for olefins, wherein the olefin is selected from the group consisting of cyclopentene, cyclododecene and 1,5,9-cyclododecatriene.

This enriched and purified $N_2O$-containing gas stream G-2 is suitable very particularly for the oxidation of olefins to ketones. For this purpose, it is possible with preference either to absorb the gas mixture G-2 directly into the olefin to be oxidized or another solvent, or the gas mixture G-2 can first be liquefied before it is reacted with the olefin.

Especially in the case of use of a liquefied gas mixture G-2, it is advantageous when the proportion of inert gases in the gas mixture G-2 is at a minimum, since the reactor volume is otherwise enlarged unnecessarily.

For the inventive use as an oxidizing agent, especially for olefins, the oxidation can generally be effected according to all process versions in which the oxidation, especially of the olefin, takes place. In particular, both continuous process versions and modes of reaction, and batchwise reaction are possible. According to the invention, the reaction conditions for the oxidation are selected such that a reaction takes place. Pressure and temperature can be selected appropriately.

The pressure is preferably in the range up to 350 bar, for example from 1 to 320 bar, preferably from 2 to 300 bar, in particular from 3 to 280 bar. The temperature is preferably in a range from 220 to 320° C., for example from 230 to 300° C., in particular from 240 to 290° C.

The oxidation may be carried out in the presence of a suitable solvent. However, it is equally possible in accordance with the invention to carry out the oxidation without the addition of a solvent.

However, it is also possible in the context of the present invention that the gas mixture G-2 is liquefied or brought into a supercritical state by a suitable selection of the pressure and/or of the temperature. The liquefied gas mixture can then be used directly in the oxidation.

According to the invention, the oxidation in this case is preferably conducted by a suitable selection of the pressure and of the temperature such that no gas phase occurs in the reaction zone.

The pressure is preferably in the range up to 350 bar, for example from 1 to 320 bar, preferably from 2 to 300 bar, in particular from 3 to 280 bar. The temperature is preferably in a range from 220 to 320° C., for example from 230 to 300° C., in particular from 240 to 290° C.

The present invention therefore also relates to a process for preparing a ketone, at least comprising the following steps A1 contacting the gas mixture G-0 with a solvent mixture (I) at least comprising 50% by weight of water based on the overall solvent mixture (I), the pH of the solvent mixture (I) being in the range from 3.5 to 8.0, to obtain a composition (A);

A2 desorption of a gas mixture G-1 from the composition (A) to obtain a solvent mixture (I');

B1 contacting the gas mixture G-1 with a solvent mixture (II) at least comprising 50% by weight of water based on the overall solvent mixture (II), the pH of the solvent mixture (II) being in the range from 2.0 to 8.0, to obtain a composition (B);

B2 desorption of a gas mixture G-2 from the composition (B) to obtain a solvent mixture (II');

C contacting the gas mixture G-2 with at least one olefin; the pH being based in each case on a measurement with a glass electrode.

For the preferred embodiments of steps A1, A2 and B1 and B2, the above remarks apply.

It is equally possible in the context of the present invention that the process comprises a plurality of steps A1 and A2 or a plurality of steps B1 and B2.

The reaction in step C may generally be effected according to any process versions in which the olefin and the gas mixture G-2 comprising dinitrogen monoxide react with one another. In particular, both continuous process versions and modes of reaction, and batchwise reaction are possible. According to the invention, the reaction conditions for step C are selected in such a way that a reaction of the at least one olefin with the gas mixture purified in accordance with the invention takes place. Pressure and temperature may be selected appropriately.

The reaction may be carried out in the presence of a suitable solvent. However, it is equally possible in accordance with the invention to carry out the reaction in step C without the addition of a solvent.

However, it is also possible in accordance with the invention that the process for preparing a ketone comprises further steps. For instance, the gas mixture G-2 may be treated, for example, before step C and after steps A1, A2, B1 and B2. A possible treatment is, for example, a change in pressure and/or temperature of the gas mixture. A further possible treatment is, for example, absorption of the gas mixture G-2 in a solvent, so that the absorbed gas mixture G-2 may be used in step C. The solvent may be any suitable solvent. The solvent is preferably the olefin which is to be oxidized in step C.

However, it is also possible in the context of the present invention that the gas mixture G-2 comprising dinitrogen monoxide is liquefied by suitable selection of the pressure and/or the temperature or is brought into a supercritical state before step C and after steps A1, A2, B1 and B2. The liquefied gas mixture comprising dinitrogen monoxide may then be contacted directly with the olefin in step C.

The present invention therefore also relates in a further embodiment to a process for preparing a ketone as described above, wherein the gas mixture used in step C has been liquefied.

In principle, it is possible in step C of the process according to the invention to use all suitable olefins, for example olefins having from 2 to 18 carbon atoms, in particular olefins having from 5 to 12 carbon atoms. Suitable olefins are, for example, open-chain or cyclic olefins having one or more double bonds. Preference is further given to cyclic olefins having one or more double bonds, for example cyclopentene, cyclohexene, cycloheptene, cyclooctene, cyclodecene, cycloundecene, cyclododecene, 1,4-cyclohexadiene, 1,5-cyclooctadiene, 1,5-cyclododecadiene or 1,5,9-cyclododecatriene.

Particular preference is given to using as the olefin cyclopentene, cyclododecene or 1,5,9-cyclododecatriene. In a preferred embodiment, the present invention therefore relates to a process for preparing a ketone as described above, wherein the olefin is selected from the group consisting of cyclopentene, cyclododecene and 1,5,9-cyclododecatriene.

The invention will be illustrated hereinafter with reference to examples.

EXAMPLES

In the examples which follow, the compositions of gas mixtures are always stated minus water (dry gas composition), unless stated otherwise. The mixtures are saturated with water at the temperature and pressure specified unless stated otherwise.

The compositions of the gas mixtures are specified as % by volume, unless other units are stated explicitly.

pH values were measured with a commercial temperature-corrected glass electrode which had been calibrated beforehand against known pH standards.

Hereinafter, $NO_x$ is understood to mean the sum of $NO_2$ and NO. The following wet-chemical method was utilized for the determination: at 0° C. and 1023 mbar absolute, a glass gas sampling cylinder of capacity 250 ml, after sampling, was charged with 30% aqueous $H_2O_2$ solution and 10% aqueous hydrochloric acid and shaken. This oxidized NO and $NO_2$ to $NO_3^-$. The gas cylinder contents were subsequently flushed out with water and nitrate was determined by ion chromatography.

The relative enrichment factor $gamma_{O2}$ is defined as $[N_2O]/[O_2]$ in the product gas in relation to $[N_2O]/[O_2]$ in the gas stream supplied. This factor is a measure of the quality of the separation between $N_2O$ and $O_2$ (enrichment of $N_2O$ and depletion of $O_2$). The higher the value of gamma, the more effective the separation. Accordingly, gamma factors can also be defined for other components.

Example 1

The feed used for the experiments was the offgas of a pressure absorption column for nitric acid synthesis, which in turn utilized, as the feed, a mixture comprising the offgas of an adipic acid plant which had been supplemented with NO.

The gas mixture was supplied at ambient temperature (maximum 40° C.) and entrance pressure 7 bar, and was saturated with water. This mixture was first cooled to 5° C. and the condensed water (nitric acid) was removed. The dried gas was then compressed to 25 bar and cooled to 35° C. This gas stream used in the absorption had the following composition: 11.9% by volume of $N_2O$, 81.5% by volume of $N_2$, 4.3% by volume of $O_2$, 1.6% by volume of $CO_2$, 0.6% by volume of Ar, 0.07% by volume of CO, 300 ppmv of $NO_x$.

This mixture was then contacted with water in a column which was filled with a structured packing (Kühni Rombopak 9M) and had a diameter of 77.9 mm and a height of 1800 mm, and the water had a pH of 8.0 at the start of the experiment which fell rapidly to 0.3. The column was operated at a temperature of 35° C. in countercurrent. The mixture was fed in from the bottom under quantitative control (2 kg/h) and withdrawn from the top under pressure control. The gas mixture withdrawn from the top was depleted in $N_2O$ and was disposed of. The composition of the gas mixture disposed of, on attainment of the steady state, was as follows: 6.8% by volume of $N_2O$, 87.2% by volume of $N_2$, 4.4% by volume of $O_2$, 0.8% by volume of $CO_2$, 0.7% by volume of Ar, 0.02% by volume of CO, 6 ppmv of $NO_x$.

Water was added from the top as an absorbent under quantitative control (200 kg/h). The laden water was withdrawn from the bottom under level control and decompressed in a desorber tower. The desorber tower had a diameter of 150 mm and a height of 300 mm. The desorber tower was operated at 35° C. and 1 bar.

The desorbed gas was enriched in $N_2O$ and had, on attainment of the steady state, the following composition: 54.9% by volume of $N_2O$, 33.1% by volume of $N_2$, 3.1% by volume of $O_2$, 8.3% by volume of $CO_2$, 0.5% by volume of Ar, 0.03% by volume of CO, 110 ppmv of $NO_x$.

The laden absorbent was recycled fully. Only sufficient fresh demineralized water which had been doped with <4 ppm of ammonia and had a pH between 9.2 and 9.8 was fed in as was necessary to keep the amount of water in the system constant (approx. 2 kg of water).

With increasing experiment time, the pH of the water used as the absorbent fell ever further and, after from 0.5 to 1 h, attained a steady-state value of 0.3.

The resulting absorbent was corrosive and manageable only with corrosion-resistant apparatus. The relative enrichment factor $gamma_{O2}$ was 6.4.

Example 2

Example 2 was performed as specified above, with the difference that 5 kg/h of the absorbent were discharged after the desorption and were replaced by fresh demineralized water which had been doped with <4 ppm of ammonia and had a pH between 9.2 and 9.8. This measure kept the pH of the absorbent stable at 2.7 in the steady state.

The gas stream used in the absorption had the following composition: 11.5% by volume of $N_2O$, 82.5% by volume of $N_2$, 3.6% by volume of $O_2$, 1.6% by volume of $CO_2$, 0.7% by volume of Ar, 0.08% by volume of CO, 225 ppmv of $NO_x$.

The gas stream obtained after the desorption had the following composition: 61.3% by volume of $N_2O$, 26.9% by volume of $N_2$, 1.9% by volume of $O_2$, 9.4% by volume of $CO_2$, 0.4% by volume of Ar, 0.04% by volume of CO, 69 ppmv of $NO_x$.

The relative enrichment factor $gamma_{O2}$ was 9.9; the consumption of absorbent was 19 kg of water/kg of $N_2O$.

Example 3

Example 3 was performed analogously to example 1. In contrast to example 1, a 10% aqueous NaOH solution was metered into the absorbent downstream of the desorber tower in order to keep the pH constant at 6.0. A fixed substream of absorbent of 2 kg/h was discharged. In order to keep the amount of absorbent in the system constant, fresh demineralized water which had been doped with <4 ppm of ammonia and had a pH between 9.2 and 9.8 was added if required.

The gas stream used in the absorption had the following composition: 13.2% by volume of $N_2O$, 80.5% by volume of $N_2$, 3.7% by volume of $O_2$, 1.7% by volume of $CO_2$, 0.8% by volume of Ar, 0.08% by volume of CO, 172 ppmv of $NO_x$.

The gas stream obtained after the desorption had the following composition: 62.3% by volume of $N_2O$, 26.0% by volume of $N_2$, 2.1% by volume of $O_2$, 8.9% by volume of $CO_2$, 0.6% by volume of Ar, 0.04% by volume of CO, 4 ppmv % of $NO_x$.

The relative enrichment factor $gamma_{O2}$ was 8.2. The consumption of absorbent was 7.4 kg/kg of $N_2O$, and 0.5 g/h of NaOH was required to keep the pH constant in the steady state. The steady-state concentration of dissolved salts in the absorbent was only 0.1% by weight.

Example 4

Example 4 was performed analogously to example 3, but the pH was kept constant at 9.0. A fixed substream of absorbent of 2 kg/h was likewise discharged. In order to keep the amount of absorbent in the system constant, fresh demineralized water which had been doped with <4 ppm of ammonia and had a pH between 9.2 and 9.8 was added if required.

The gas stream used in the absorption had the following composition: 14.5% by volume of $N_2O$, 78.8% by volume of $N_2$, 3.7% by volume of $O_2$, 2.0% by volume of $CO_2$, 0.9% by volume of Ar, 0.08% by volume of CO, 185 ppmv of $NO_x$.

The gas stream obtained after the desorption had the following composition: 69.3% by volume of $N_2O$, 24.3% by volume of $N_2$, 2.0% by volume of $O_2$, 3.8% by volume of $CO_2$, 0.5% by volume of Ar, 0.04% by volume of CO, 4 ppmv of $NO_x$.

The relative enrichment factor $gamma_{O2}$ was 9.0. The consumption of absorbent was 7.7 kg/kg of $N_2O$.

The requirement for NaOH to keep the pH constant was 42 g/h of NaOH. The steady-state concentration of dissolved salts in the absorbent was, at 6% by weight, significantly higher than in example 3. $CO_2$ was more highly depleted in comparison to example 3.

Example 5

Example 5 was performed analogously to example 3. In addition, however, the gas obtained after the first desorption stage was concentrated further in a second concentration stage which, in its fundamental function, was constructed analogously to the first concentration stage. However, the second concentration stage was not equipped with NaOH feeding and pH control.

The gas stream used in the first absorption had the following composition: 13.7% by volume of $N_2O$, 78.4% by volume of $N_2$, 5.6% by volume of $O_2$, 1.7% by volume of $CO_2$, 0.8% by volume of Ar, 0.08% by volume of CO, 380 ppmv of $NO_x$.

The first concentration stage was operated analogously to example 3. Downstream of the first desorption stage, a gas stream with the following composition was obtained: 59.5% by volume of $N_2O$, 24.1% by volume of $N_2$, 3.0% by volume of $O_2$, 7.5% by volume of $CO_2$, 0.5% by volume of Ar, 0.04% by volume of CO, 5 ppmv of $NO_x$.

This gas stream was compressed to 25 bar, cooled to 35° C. and fed into the absorber of the downstream second concentration stage. The absorber of the second stage was, like that of the first stage too, designed as a column with diameter 50 mm and was equipped with a structured packing (Kühni Rombopak 9M) with a height of 1200 mm. In the absorber, the gas was contacted with water (approx. 164 g ($H_2O$)/g ($N_2O$ fed in)). The column was operated in countercurrent at a temperature of 35° C. and a pressure of 25 bar. The gas mixture withdrawn at the top from the second absorber was disposed of.

The pH of the water in the second absorption stage was 7.0±0.5 during the experiment.

The laden water was decompressed to a pressure of about 1.10 bar in a second desorber. This afforded a product gas stream with the following composition: 81.7% by volume of $N_2O$, 1.7% by volume of $N_2$, 0.45% by volume of $O_2$, 10.7% by volume of $CO_2$, 0.1% by volume of Ar, 0.005% by volume of CO.

The laden absorbent was recycled fully. Only sufficient fresh demineralized water which had been doped with <4 ppm of ammonia and had a pH between 9.2 and 9.8 was fed in as was necessary to keep the amount of water in the system constant (approx. 20 g/h).

Based on the amount of $N_2O$ fed into the first concentration stage, an $N_2O$ yield of 65% was achieved with this experimental arrangement.

What is claimed is:

1. A process for purifying a gas mixture G-0 comprising dinitrogen monoxide, comprising:
   A1 contacting the gas mixture G-0 with a solvent mixture (I) at least comprising 50% by weight of water based on the overall solvent mixture (I), the pH of the solvent mixture (I) in the range from 3.5 to 8.0, to obtain a composition (A);
   A2 desorption of a gas mixture G-1 from the composition (A) to obtain a solvent mixture (I');
   B1 contacting the gas mixture G-1 with a solvent mixture (II) at least comprising 50% by weight of water based on the overall solvent mixture (II), the pH of the solvent mixture (II) in the range from 2.0 to 8.0, to obtain a composition (B);
   B2 desorption of a gas mixture G-2 from the composition (B) to obtain a solvent mixture (II');
   the pH in each case based on a measurement with a glass electrode,
   and wherein the pH of the solvent mixture (I), the pH of the solvent mixture (II) or the pH of the solvent mixture (I) and the pH of the solvent mixture (II) is adjusted by adding a base.

2. The process according to claim 1, wherein the gas mixture G-0 is the offgas of at least one of an adipic acid plant, a dodecanedicarboxylic acid plant, a hydroxylamine plant, and a nitric acid plant operated with the offgas of at least one of an adipic acid plant, a dodecanedicarboxylic acid plant, and a hydroxylamine plant.

3. The process according to claim 1, wherein the solvent mixture (I), the solvent mixture (II), or the solvent mixture (I) and the solvent mixture (II) comprises at least 80% by weight of water, based in each case on the overall solvent mixture (I) or (II).

4. The process according to claim 1, wherein the solvent mixture (I), the solvent mixture (II), or the solvent mixture (I) and the solvent mixture (II) comprises less than 10% by weight of salts, based in each case on the overall solvent mixture (I) or (II).

5. The process according to claim 1, wherein the pH of the solvent mixture (I), the pH of the solvent mixture (II), or the pH of the solvent mixture (I) and the pH of the solvent mixture (II) is in the range from 6.0 to 7.0.

6. The process according to claim 1, wherein the solvent mixture (I') is recycled into the process at least partly as the solvent mixture (I), or
   wherein the solvent mixture (II') is recycled into the process at least partly as the solvent mixture (II), or
   wherein the solvent mixture (I') is recycled into the process at least partly as the solvent mixture (I) and the solvent mixture (II') is recycled into the process at least partly as the solvent mixture (II).

7. The process according to claim 1, wherein the pH of the solvent mixture (I), the pH of the solvent mixture (II), or the pH of the solvent mixture (I) and the pH of the solvent mixture (II) is adjusted by adding at least one base selected from the group consisting of an alkali metal hydroxide, an alkali metal carbonate, an alkali metal hydrogencarbonate, an alkali metal phosphate, an alkaline earth metal hydroxide, an alkaline earth metal carbonate, an alkaline earth metal hydrogencarbonate, and an alkaline earth metal phosphate.

8. The process according to claim 1, wherein the pressure in the contacting in A1, B1, or A1 and B1 is in a range of from 10 to 35 bar.

9. The process according to claim 1, wherein A1 and A2, B1 and B2, or A1, A2, B1, and B2 are carried out in a dividing wall column.

10. The process according to claim 1, wherein the resulting gas mixture G-2 is liquefied.

* * * * *